United States Patent [19]

Girod

[11] Patent Number: 5,565,931
[45] Date of Patent: Oct. 15, 1996

[54] METHOD AND APPARATUS FOR APPLYING GAMMA PREDISTORTION TO A COLOR IMAGE SIGNAL

[75] Inventor: Bernd Girod, Spardorf, Germany

[73] Assignee: Vivo Software. Inc., Waltham, Mass.

[21] Appl. No.: 332,122

[22] Filed: Oct. 31, 1994

[51] Int. Cl.⁶ .................................................. H04N 9/69
[52] U.S. Cl. ........................ 348/675; 348/660; 348/254
[58] Field of Search .................................. 348/674, 675, 348/659, 660, 661, 254; 358/32, 164, 30; H04N 5/202, 9/69, 9/67

[56] References Cited

U.S. PATENT DOCUMENTS

| 4,751,566 | 6/1988 | Pilot | 348/675 |
| 4,999,702 | 3/1991 | Knierim | 348/675 |

FOREIGN PATENT DOCUMENTS

| 3341667 | 5/1985 | Germany . |
| 3620990 | 1/1988 | Germany . |

OTHER PUBLICATIONS

A. Netravali and B. Haskell, Digital Pictures, Plenum Press, New York, 1988.
International Telecommunication Union—Radiocommunication Study Groups—Draft Revision of Recommendation ITU-R BT, 601-4 "Studio Encoding Parameters of Digital Television for Standard 4.3 and Wide–Screen 16:9 Aspect Ratios", 24 Oct. 1994, pp. 1–24.

Primary Examiner—Safet Metjahic
Assistant Examiner—Sherrie Hsia
Attorney, Agent, or Firm—Wolf, Greenfield & Sacks, P.C.

[57] ABSTRACT

A system and method for generating gamma-predistorted video signals. A close approximation to the ideal gamma predistorted values of Y, Cr and Cb video signal components are generated from linear camera or computer output signals using at most a single matrix multiplication, one channel of inverse gamma function generation (on the luminance component) and two table look up operations. The linear luminance value is predistorted by an inverse gamma function. If they are not available from the video source, a matrix multiplication is used to generate linear luminance and chrominance signals. The linear chrominance signals are then adjusted for their dependence on luminance using a two-dimensional table look-up. The lookup table(s) is (are) addressed by the linear luminance value and by each of the linear chrominance values to produce gamma-predistorted Cr and Cb signals from the tables.

24 Claims, 2 Drawing Sheets

METHOD AND APPARATUS FOR APPLYING GAMMA PREDISTORTION TO A COLOR IMAGE SIGNAL

FIELD OF THE INVENTION

This invention relates generally to a method and apparatus for applying a non-linear transformation to color video image signals. In particular, it relates to a method and apparatus for converting linear color video signals, such as signals in the Y,Cr,Cb representation or format, without gamma predistortion, into gamma-predistorted signals in the same or another video signal space.

BACKGROUND

The light output of a cathode-ray tube (CRT) exhibits a power-law relationship to a video signal (e.g., voltage) applied to the CRT. To compensate for this non-linear behavior, the video signal applied to the CRT typically is "predistorted" with a power law function which is the inverse of that of the CRT. The resulting signal, which is used to modulate the CRT beam intensity, linearizes the overall transfer function of the light output of the CRT relative to the incident light levels at the video camera or other source.

The normalized light output (photometric luminance) from the CRT is defined by the well-known power law function $L=E^\gamma$ where E is the video signal magnitude (e.g., voltage) and $\gamma$ (i.e., the Greek letter "gamma") is a characteristic of the CRT; L and E are both normalized relative to maximum permissible values. $\gamma$ is typically in the range of about 2.0 to 2.5. To produce a linear overall characteristic, the incident image from the video camera $E_i$ is transformed to E by the relationship $E=E_i^{1/\gamma}$ where again, E and $E_i$ are normalized values. When the video camera output is a linear function of the input illumination, the entire transformation is performed by operating on the video signal output from the camera. This mathematical process of transforming the video camera output by application of an inverse power law is known as applying an inverse gamma function or, more commonly, as gamma-correcting or gamma-predistorting the video signal(s). (If the camera output were a non-linear function of the illumination, the transformation would have to be appropriately modified so that the cascading of the camera transfer function and the operation on its output are equivalent to the gamma-predistortion of a linear signal.) A video signal which has been gamma-predistorted can, in turn, be linearized by applying the gamma function $E_o=E^\gamma$ to the signal; this process is known as inverse gamma correction (and it is the mathematical model for the response of the CRT itself, of course). If the display device is linear but gamma-corrected image signals are to be displayed, then circuitry has to be provided along with or in the display to intercept the gamma-predistorted video signals and to gamma distort (i.e., inversely gamma correct) them before application to the display, to achieve an overall linear transfer function and accurately reproduce the color content of the image.

Many texts are available which explain gamma correction in the context of video, particularly television, systems. U.S. Pat. No. 5,196,924, for example, illustrates and explains gamma correction during image reproduction. The discussion therein is partially repeated and summarized here and the remainder of that patent is incorporated by reference for background.

In computer graphics systems, wherein an image is synthesized by the computer, the signal produced by the computer, for use by a monitor having a CRT, must be made to exhibit the same behavior as signals from a video camera, discussed above. Therefore, gamma-correction/predistortion is used on video signals applied to computer monitors as well as to television signals, to linearize the video output.

A color CRT typically receives three color component signals supplied on three independent channels. These channels are generally called R, G and B, corresponding to red, green and blue phosphors on the CRT screen. Selective excitation of the three phosphors at each place on the screen produces varying amounts of light from each phosphor, which red, green and blue lights are additively mixed to produce the displayed image. Each of the three channels requires gamma correction to ensure proper color reproduction.

In the prior art, gamma-predistortion typically is accomplished, as exemplified in FIG. 1, by performing two matrix multiplication operations (12 and 14) and three power law functions (16R, 16G, 16B) to produce a gamma-predistorted set of video signals from a video camera (not shown) or other source which provides a linear (i.e., gamma undistorted) output. These operations may be carried out in either the analog domain or in the digital domain, though for the purposes of this discussion, it shall be assumed that the video image signals are composed of a sequence of digital samples; however, unless specifically indicated otherwise, this discussion is not limited to digital processing.

For purposes of illustration only, and not to lose generality, the video camera output will be presumed to be digital samples of three components of a color image; these components may generically be referred to as $C_1$, $C_2$ and $C_3$, to avoid implying any specific signal format. One popular type of camera output is a set of linear red (R), green (G) and blue (B) samples; "linear" means the sample value is proportional to the illumination on the camera target. Note that the camera RGB components can never be the same as the display primaries, for physical reasons. RGB signals are but one way of conveying the color information content of a video scene. Several other video signal representations have been adopted for various uses. Each of these representations can be mapped, using known operations, to any of the other representations. The three RGB signals from an RGB source, for example, may be mathematically combined (mapped) in various ways to provide equivalent representations of the same video information in other signal spaces using any of the other conventional signal sets (or even a non-conventional signal set). For example, they (R,G,B components) may be transformed into equivalent components in a standard YUV, CIE XYZ or other video signal color space. One such common video signal set is the Y,Cr,Cb signal set and it is the provision of gamma-predistorted Y, Cr and Cb component samples from a set of linear input components to which the present invention is most particularly directed in its exemplary embodiment.

At any given point in an image, the Y signal represents the luminance value; the Cr component is a scaled replica of the color difference signal often called R-Y (which is the difference between the red color level and the luminance); and the Cb component is a scaled replica of the color difference signal often called B-Y (which is the difference between the blue color level and the luminance). A good explanation of various color space representations and transformations may be found in A. Netravali and B. Haskell, *Digital Pictures,* Plenum Press, New York, 1988, which is hereby incorporated by reference.

The International Radio Consultative Committee (CCIR) in Recommendation 601, *Encoding Parameters of Digital Television for Studios,* CCIR XVth Plenary Assembly, Document 11/1041-E, Dubrovnik, Dec. 11, 1985, pp. 1–10, calls for a representation of color images (Y,Cr,Cb) using digital signals representative of luminance, Y, and two color difference components, Cr and Cb, representative of the color signal differences R–Y and B–Y, for each pixel respectively. Recommendation 601 also calls for subsampling the color difference signals by a factor of two-to-one with respect to the luminance signal. That is, each two pixels is represented by two luminance signal values, respectively, and by one pair of color difference signal values. In order to save some space when storing color digital image signals or to reduce the required communication bandwidth when communicating color digital image signals, ISO 11172 MPEG International Standard and ITU-T Recommendation H.261 require spatial subsampling of the color difference signals with respect to the luminance signal by a factor of four-to-one. That is, each frame is divided into two-by-two pixel regions, each two-by-two pixel region represented by four luminance signal values and two color difference signal values. Each pixel is associated with its own luminance signal value, but each group of four pixels is associated with only one color difference signal value for each of the two color difference signals, Cr and Cb.

Generation of a gamma-predistorted Y,Cr,Cb signal set from a linear set of input components is complicated by the fact that (since gamma nonlinearity is a function of the CRT characteristics) application of an inverse gamma function (i.e., gamma predistortion) is most efficiently (and most directly) done in the RGB signal domain. Any other approach is more complicated. Commonly, two matrix multiplications and one (per color channel) non-linearization (inverse gamma) function are required to convert linear component signals from a video camera to an equivalent set of Y,Cr,Cb signals. As shown in FIG. 1, the first matrix multiplication 12 maps the camera output signals into the color space defined by the display primaries; it produces a set of signals which shall be designated R*, G* and B*. Assuming the camera provides Y,Cr,Cb component output, the first matrix multiplication is given by $$\begin{pmatrix} R^* \\ G^* \\ B^* \end{pmatrix} = \begin{pmatrix} 1 & 1 & 0 \\ 1 & -.5098 & -.1954 \\ 1 & 0 & 1 \end{pmatrix} \begin{pmatrix} Y^* \\ Cr^* \\ Cb^* \end{pmatrix}$$

The asterisks as superscripts are used to denote linear signals. Obviously, if the input signals are in a format other than Y,Cr,Cb, a different conversion matrix will be necessary; however the coefficients for the conversion matrices are readily known or calculable for the conventional color component signal formats.

A non-linear mapping (i.e., gamma predistortion 16R, 16G and 16B) is then applied to each of the three signals R*, G* and B*, producing a set of gamma-predistorted signals R, G and B according to the equations:

$R = \gamma^{-1}(R^*)$ $G = \gamma^{-1}(G^*)$ $B = \gamma^{-1}(B^*)$ where $\gamma^{-1}$ is the predistortion non-linearity. These R, G and B signals are then matrix multiplied, in matrix 14, using a known coefficient set, to yield gamma predistorted Y, Cr and Cb signals as follows:

$$\begin{pmatrix} Y \\ Cr \\ Cb \end{pmatrix} = \begin{pmatrix} 0.299 & 0.586 & 0.1146 \\ 0.701 & -0.586 & -0.1146 \\ -0.299 & -0.586 & 0.8854 \end{pmatrix} \begin{pmatrix} R \\ G \\ B \end{pmatrix}$$

While this approach is satisfactory, and has been used conventionally, it is less efficient computationally than is desired in some systems. Where the gamma predistorted Y,Cr,Cb signal set is to be further processed, such as for transmission or recording, the processing time for all of the operations may be greater than desired or available. Then it is desirable and advantageous to produce the Y,Cr,Cb signal set with fewer computational steps and, therefore, less computing time.

SUMMARY OF THE INVENTION

To achieve the foregoing and other objects and to provide the attendant advantages, the present invention provides a method and apparatus for generating efficiently close approximations to the ideal gamma-predistorted values of Y, Cr and Cb. These approximations are generated from linear camera output signals using at most a single matrix multiplication, one channel of inverse gamma function generation and two table look up operations (one for each chrominance component). If the input color components are not already mapped into linear Y, Cr, Cb color space, a matrix multiplication is first performed to provide, from the supplied video components, equivalent linear Y,Cr,Cb components. The linear Y,Cr,Cb components (Y*, Cr* and Cb*), however obtained or supplied, are then processed as follows: The linear luminance signal/component, Y* is predistorted by an inverse gamma function, $\gamma^{-1}(Y)$. The linearized color difference component signals Cr* and Cb* are then adjusted for their dependence on luminance (thereby indirectly taking into account an inverse gamma function) using a pair of two-dimensional lookup tables, one for Cr and one for Cb. Each lookup table is addressed in a first dimension by the linear luminance value and in a second dimension by the respective linear color difference component. The tables thus yield approximate values for gamma-predistorted Cr and Cb component samples; some error is introduced for reasons discussed below.

The advantages of this arrangement, and its further features, will become more apparent from the following detailed description, which should be read in conjunction with the accompanying drawing.

DETAILED DESCRIPTION

Figure 2:
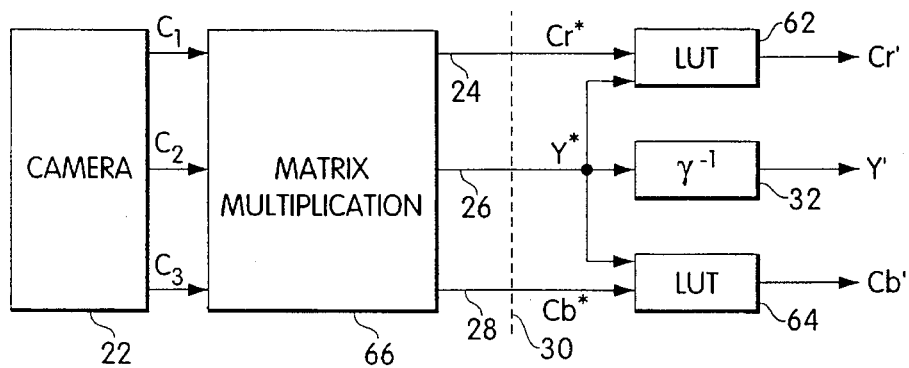
FIG. 2 is a block diagram of an exemplary gamma-predistortion system according to the invention.

Turning now to FIG. 2, a basic block diagram is shown for an exemplary implementation of the gamma predistortion system 20 of the present invention. A video signal source (which need not be a camera but which will be referred to as a camera for simplicity, without intending any loss of generality) 22 initially shall be presumed to provide linear luminance and color difference output signals on lines 24, 26 and 28, respectively. (A dashed vertical line 30 is provided as a reminder that the signal source to the left of the line can have various forms and is not a necessary aspect of the invention in its broadest sense.) Consistent with the notation used above, these linear signals shall be identified by the labels Y*, Cr*, and Cb*.

The Y signal is gamma-predistorted in block 32 (which may be implemented as a lookup table or any other suitable function generator), using a conventional inverse gamma function. The output of block 32, Y', is correct when the color difference signals are zero, but for other conditions, particularly saturated colors, the value of Y' will be incorrect (since, as stated above, gamma is a property of the CRT and an inverse gamma function accurately predistorts the transmitted signal only when applied to R, G and B signals).

Approximate gamma predistorted chrominance signals are produced by exploiting the relationships Cr= R-Y and Cb= B-Y (excluding a scaling factor, or multiplier), using for Y the approximate value Y' from function 32. Thus $$Cr' = R - Y' = \gamma^{-1}(R^*) - \gamma^{-1}(Y^*) \quad (40)$$
$$= \gamma^{-1}(Cr^* + Y^*) - \gamma^{-1}(Y^*)$$
$$Cb' = B - Y' = \gamma^{-1}(B^*) - \gamma^{-1}(Y^*) \quad (50)$$
$$= \gamma^{-1}(Cb^* + Y^*) - \gamma^{-1}(Y^*)$$

Using this approach, the R and B signals receive the correct compensation but the green component has not been treated correctly. For weakly saturated colors, the error in the green signal (when it is derived in the receiver, from the luminance and chrominance signals) is small. However, for highly saturated colors, there may be too much or too little green. Experience indicates that the error in the green level is quite tolerable to the viewer.

As seen from equations 40 and 50, the values of Cr' and Cb' can be implemented using one two-dimensional lookup table (LUT) for Cr' and one two-dimensional lookup table for Cb'. The Cr' LUT 62 is addressed by Cr* and Y*; the Cb' LUT 64 is addressed by Cb* and Y*. The values stored in the LUTs are those determined by equations 40 and 50. In the simplest arrangement, LUT 62 and LUT 64 will be separate, allowing individual scaling of the Cb* and Cr* signals. However, it is also possible, if the same scaling is to be applied, to combine the two LUTs and to alternately supply Cr' and Cb' outputs. For separate LUTs, a capacity of about 64 kbytes each will provide adequate quantization for tables addressed by 16-bits (two 8-bit address components). Satisfactory resolution is achievable with 8-bit data values, but greater or lesser resolution can be used as a matter of design choice. For the luminance corrector 32, a 256-entry lookup table may typically be used. Of course, a larger or smaller amount of memory may be used for the LUT(s), according to the system parameters selected and performance desired.

Figure 3:
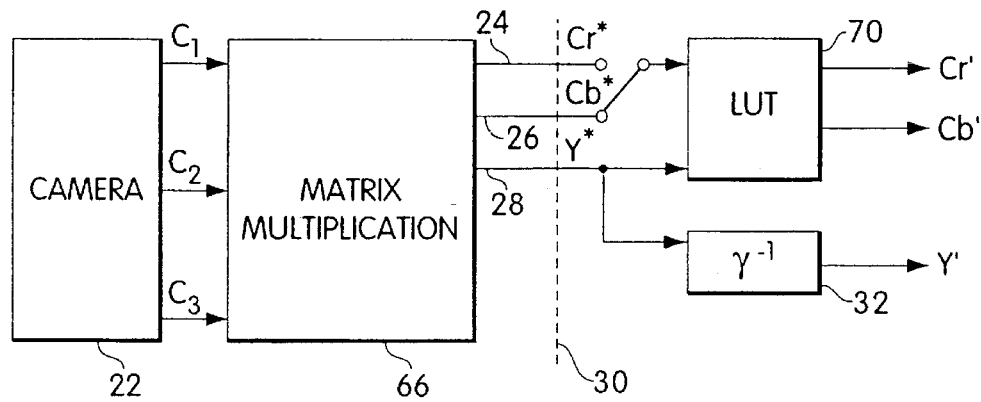
FIG. 3 is a block diagram of an alternative embodiment for implementing the invention.
Figure 4:
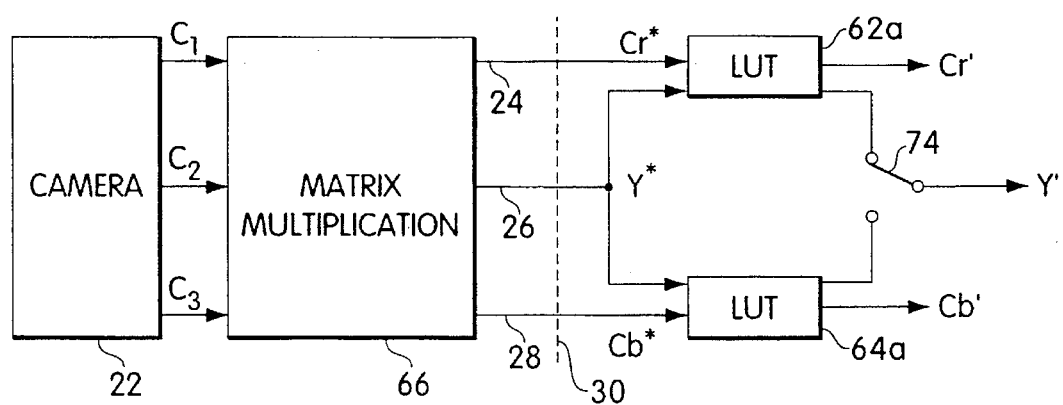
FIG. 4 is a block diagram of another alternative embodiment for implementing the invention.

As is recommended by CCIR 601, Cr and Cb are sampled at half the rate at which Y is sampled; thus it is necessary to provide output chrominance samples from LUTs 62 and 64 at only half the rate luminance output samples are provided from the $\gamma^{-1}$ function LUT 32. This situation makes feasible a number of alternative implementations. For example, as shown in FIG. 3, LUTs 62 and 64 may be combined into a single chrominance LUT 70 if the chrominance components are scaled equally. Through appropriate control logic (not shown), the LUT may be addressed alternately by Cr* and Cb*, with new Cr' and Cb' values appearing in relation to this alternating addressing. As a further alternative, as shown in FIG. 4, a separate LUT 32 for the $\gamma^{-1}$ function may be eliminated and the gamma predistortion of the luminance signal may be built into both of the LUTs 62a and 64a which supply chrominance output. That is, each of LUTs 62a and 64a supplies a gamma-predistorted luminance output sample in addition to a gamma-predistorted chrominance output sample, at the chrominance sampling rate. The luminance samples from the LUTs 62a and 64a are then interleaved by switch/multiplexer 74 into the output Y'. Thus the need is obviated for a higher speed lookup table or function generator 32. No doubt still further variations of these structures will occur to those skilled in the art.

Figure 1:
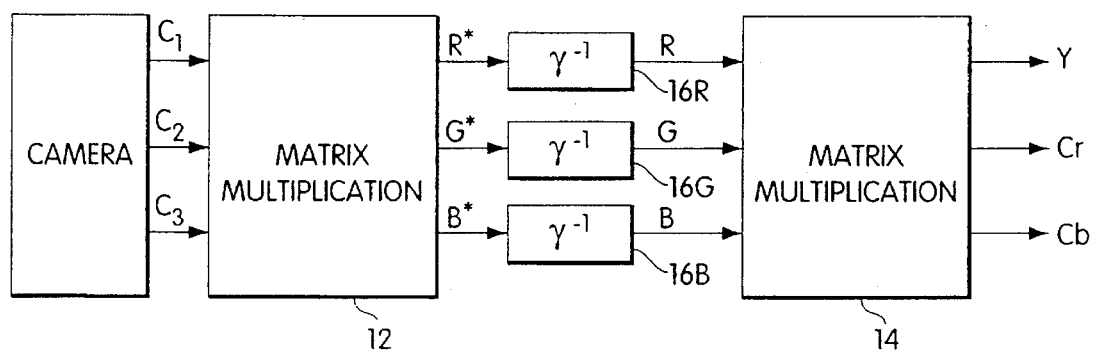
FIG. 1 is a block diagram of a prior art gamma-predistortion system.

For an alternative implementation, it is possible to switch between two LUT schemes, alternating between odd and even lines of a video frame. For example, for even lines, Cr' and Y' can be looked up together as a function of Cr* and Y* for a given luminance sample. Then Cb' and Y' can be looked up together as a function of Cb* and Y* for the next luminance sample in the same line. Sample by sample for that line, the lookups would alternate between using the Cr',Y' table and the Cb',Y' table. Then for odd lines, Y' can be looked up simply as a function of Y* for each luminance sample. Thus, only one table look-up operation (simultaneously providing one chrominance sample and one luminance sample) is executed per luminance sample. In the prior art, such as shown in FIG. 1, subsampling of the chrominance components occurs at the outputs of natrix multiplication 14. By contrast, according to the present invention, the chrominance components are subsampled prior to the inputs of the lookup tables. Thus, fewer lookup operations are required per unit time (or, equivalently, per luminance sample).

The invention is implemented, in the example shown, by executing all operations on a conventional general purpose digital computer. The LUTs are data structures in memory, with the contents of each location determined in advance in accordance with the formulas given above. The matrix multiplications are conventionally implemented using well-known algorithms; the coefficients may be as given in the examples or other suitable coefficients may be substituted.

Alternatively, it will be understood by those skilled in the art that dedicated circuitry may be employed to perform all of the indicated functions. For example, the LUTs may be stored in read-only memory (ROM) and dedicated circuits ay be used to control the operations of the ROMs, the switching of signals, and so forth.

The luminance of a studio monitor which was assumed typical has been measured, with the monitor set up according to the CCIR 500 standard viewing conditions. The black level corresponded to a digital value of Y=16 in the range 0 . . . 255, with a luminance of 0.7 cd/m². Peak white level corresponded to Y=235 and a luminance of 70 cd/m². The gamma characteristic of the monitor thus can be precisely described by the equation $$L = Lm (Y+YO)^\gamma,$$

where Lm=0.35×10$^{-3}$ cd/m²; YO=15, and y=2.2. Rewriting, $$Y = (L/Lm)^{1/\gamma} - YO.$$

For linear camera input signals, an offset may have to be added or subtracted to adjust the zero point of the luminance scale for Y*.

Sometimes the camera gamma is selected to differ from the display gamma, to manipulate the contrast of the image. Consequently, other values may be used for gamma in this gamma predistortion system.

If the video camera does not provide Y, Cr, Cb output but presents its video signals in another format (e.g., RGB), then as shown in FIG. 2, a matrix multiplication operation 66 may be performed on the camera output to convert it to Y,Cr,Cb form for processing as already explained. If the video source is a computer, the matrix operation can be built into the video driver.

Advantageously, the use of lookup tables addressed in part by luminance values also provides ready solutions to two common problems; these solutions are provided without requiring any additional signal processing steps or any additional hardware.

The first problem is the interaction of white balancing and camera saturation. As the illumination increases toward a point where the camera's luminance output starts to saturate, it is necessary to vary the white balance (i.e., the scalings of the components) or white regions will begin to look tinted (commonly, yellowish or cyanish) and other regions similarly will take on an incorrect cast. To avoid this result, the entries in the Cr' and Cb' LUTs 62 and 64, for higher values of Y*, may be reduced in magnitude so as to fade out color tint as luminance approaches saturation. That is, above some threshold value of Y*, the table values may be reduced from those which otherwise would be provided from equations 40 and 50. The selection of threshold and the amount to change the values from those computed by the equations may be determined experimentally; they are functions of the camera's response characteristics and subjective determination of acceptable color balance.

The second problem occurs at the opposite end of the photometric illumination range. When luminance is low, the Cr' and Cb' chrominance components may be "noisy" and cause a visually annoying effect in the image. To alleviate this problem, the entries in LUTs 62 and 64 may, below some selected threshold value of Y*, be reduced below those determined from equations 40 and 50. That is, in darker areas of the image, colors may be desaturated. The human eye is less sensitive to color in low light conditions, so this approach takes advantage of human physiology to reduce disturbing artifacts of color.

These various aspects of the invention are useful in video cameras themselves, as well as in the processing of camera outputs. Some video cameras, for example, internally generate signals in a YIQ color space. These YIQ signals may then, for example, be supplied to an NTSC encoder circuit to provide an NTSC output for a video cassette recorder or for a television. By using appropriately different conversion matrices, the same architecture can provide gamma-predistorted YIQ signals instead of Y,Cr,Cb signals.

Further, since Cr and Cb are the same as U and V, except for a scaling factor on each, by properly scaling the values in the LUTs 62 and 64, gamma-predistorted YUV output is achieved.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested hereby, and are within the spirit and scope of the invention. Accordingly, the invention is limited only by the following claims and equivalents thereto:

What is claimed is:

1. Apparatus for producing, from samples of substantially linear video components of a color image comprising a linear luminance component and linear first and second chrominance components, samples of corresponding gamma-predistorted video components, comprising:

a. an inverse gamma function generator which supplies, from a linear luminance sample Y* obtained by sampling the linear luminance component, a gamma-predistorted luminance value Y', according to the relationship $Y'=(Y')^{1/\gamma}$, where $\gamma$ is the gamma of a display to be driven by said gamma-predistorted video components; and b. for at least one chrominance component, a corresponding chrominance lookup table addressed by both the value of the linear luminance sample and the value of the chrominance component and supplying a substantially gamma-predistorted chrominance component value.

2. The apparatus of claim 1 wherein the inverse gamma function generator is a lookup table.

3. The apparatus of claim 1 wherein the at least one chrominance component includes a first color difference component and a second color difference component, and the corresponding chrominance lookup table include a first lookup table addressed by the value of the linear luminance sample and the first color difference component and supplying a substantially gamma-predistorted first color difference component value, and a second lookup table addressed by the value of said linear luminance sample and the second color difference component and supplying a substantially gamma-predistorted second color difference component value.

4. The apparatus of claim 3 wherein the first color difference component is an R-Y component and the second color difference component is a B-Y component, Y representing a luminance value, R representing a red color level and B representing a blue color level.

5. The apparatus of any of claims 1–3 further including:

a source of said samples of substantially linear video, components of the color image; and means for generating from said samples a sequence of linear luminance samples and sequences of first and second chrominance components samples.

6. The apparatus of claim 5 wherein the means for generating is a matrix multiplication means which generates the sequence of linear luminance samples and the sequences of first and second chrominance component samples by applying a matrix multiplication to the samples of components of the color image.

7. The apparatus of claim 1 wherein said lookup table is addressed at certain times by the value of the linear luminance sample and the value of a first one of the chrominance components and at other times by the value of the linear luminance sample and the value of a second one of the chrominance components.

8. Apparatus for producing from substantially linear video components comprising a linear luminance component and linear, first and second chrominance components, corresponding gamma-predistorted video components, comprising:

a first lookup table addressed by the value of a sample of the linear luminance component and a sample of the first chrominance component and supplying a substantially gamma-predistorted first chrominance component value and a substantially gamma-predistorted luminance value;

a second lookup table addressed by the value of a sample of the luminance component and the value of a sample of the second chrominance component and supplying a substantially gamma-predistorted second chrominance component value and a substantially gamma-predistorted luminance value; and a multiplexer connected to receive the gamma-predistorted luminance values from the first and second lookup tables and to alternatingly select the gamma-predistorted luminance value from the first lookup table and the gamma, predistorted luminance value from the second lookup table.

9. A method of producing, from substantially linear video components comprising a linear luminance component and first and second chrominance components, corresponding gamma-predistorted video components, comprising the steps of:

a. predistorting the linear luminance component, Y*, by an inverse gamma function, to produce a gamma-predistorted luminance component, Y';

b. addressing a first two-dimensional lookup table in a first dimension by the linear luminance component, Y*, and in a second dimension by the first chrominance component, to provide a gamma-predistorted first chrominance component; and c. addressing a second two-dimensional lookup table in a first dimension by the linear luminance component, Y*, and in a second dimension by the second chrominance component, to provide a gamma-predistorted second chrominance component.

10. The method of claim 9 wherein the chrominance components are color difference signals whose values are the difference between a color component and a luminance component.

11. A method of producing, from substantially linear video components comprising a linear luminance component and first and second chrominance components, corresponding gamma-predistorted video components, comprising the steps of:

a. predistorting the linear luminance component, Y', by an inverse gamma function, to produce a gamma-predistorted luminance component, Y'; and b. addressing a two-dimensional lookup table
   1. at first instances, in a first dimension by a sample of the linear luminance component Y', and in a second dimension by a sample of the first chrominance component, to provide a gamma-predistorted first chrominance component; and
   2. at second instances, in a first dimension by a sample of the linear luminance component, Y*, and in a second dimension by a sample of the second chrominance component to provide a gamma-predistorted second chrominance component.

12. The method of claim 11 wherein the chrominance components are color difference signals whose values are the difference between a color component and a luminance component.

13. A method of producing from substantially linear video components comprising a linear luminance component and first and second chrominance components corresponding gamma-predistorted video components, comprising the steps of:

a. addressing a first lookup table by the value of the linear luminance component and the first chrominance component and supplying a substantially gamma-predistorted first chrominance component value and a substantially gamma-predistorted luminance value;

b. addressing a second lookup table by the value of the linear luminance and the second chrominance component and supplying a substantially gamma-predistorted second chrominance component value and a substantially gamma-predistorted luminance value; and c. interleaving the gamma-predistorted luminance values from the first and second lookup tables.

14. The method of claim 13 wherein the chrominance components are color difference signals whose values are the difference between a color component and a luminance component.

15. The method of claim 13, wherein the step of interleaving selects the gamma-predistorted luminance value from the first lookup table during a first set of lines of a video frame and selects the gamma-predistorted luminance value from the second lookup table during a second set of lines of said video frame.

16. The method of claim 15 wherein the first set of lines are the odd lines of the video frame.

17. The method of claims 9 or 13 wherein in said lookup tables, entries below some selected threshold value of the linear luminance component are reduced in chrominance amplitude to desaturate colors in darker image areas.

18. The method of claims 9, or 13 wherein in said lookup tables, entries above a predetermined threshold value of the linear luminance component are reduced in chrominance amplitude to fade out colors in image areas where luminance starts to saturate.

19. The apparatus of claims 3 or 8 wherein in said lookup tables, entries below some selected threshold value of the linear luminance sample are reduced in chrominance amplitude to de-saturate colors in darker image areas.

20. The apparatus of claim 19 wherein the reduction in chrominance amplitude is relative to a corresponding gamma-predistorted component value.

21. The apparatus of claims 3 or 8 wherein in said lookup tables, entries above a predetermined threshold value of the linear luminance sample are reduced, to fade out colors in image areas where luminance starts to saturate.

22. The apparatus of claim 21 wherein said reduction in chrominance amplitude is relative to a corresponding gamma-predistorted component value.

23. The method of claim 1 or 11 wherein in said lookup table, entries below some selected threshold value of the linear luminance sample are reduced in chrominance amplitude to de-saturate colors in darker image areas.

24. The method of claim 1 or 11 wherein in said lookup table, entries above a predetermined threshold value of the linear luminance sample are reduced in chrominance amplitude to fade out colors in image areas where luminance starts to saturate.

* * * * *